United States Patent [19]
Hansen

[11] 3,750,798
[45] Aug. 7, 1973

[54] SUPPORT PAD FOR CONVEYOR CHAIN AND COMBINATION THEREOF WITH CONVEYOR CHAIN

[75] Inventor: Niels S. Hansen, Fort Wayne, Ind.
[73] Assignee: Foundation and Bridge Corp., Fort Wayne, Ind.
[22] Filed: May 12, 1971
[21] Appl. No.: 142,640

[52] U.S. Cl. .................................... 198/1, 198/137
[51] Int. Cl. ........................................... B65g 15/00
[58] Field of Search ................. 198/137, 198, 127; 188/196 BA

[56] References Cited
UNITED STATES PATENTS

| | | | |
|---|---|---|---|
| 3,509,987 | 5/1970 | Flaith et al. | 198/137 X |
| 3,473,633 | 10/1969 | Hagerty | 188/196 BA |
| 3,140,774 | 7/1964 | Johnston et al. | 198/137 |

*Primary Examiner*—Richard E. Aegerter
*Assistant Examiner*—Hadd S. Lane
*Attorney*—Jeffers and Rickert

[57] ABSTRACT

The specification discloses a conveyor chain running in a horizontal direction adjacent a stationary surface and a pad adapted for connection with the conveyor chain and slidable on the surface so as to hold the conveyor chain in spaced relation to the surface and eliminating wearing of the chain and surface.

3 Claims, 4 Drawing Figures

PATENTED AUG 7 1973 3,750,798
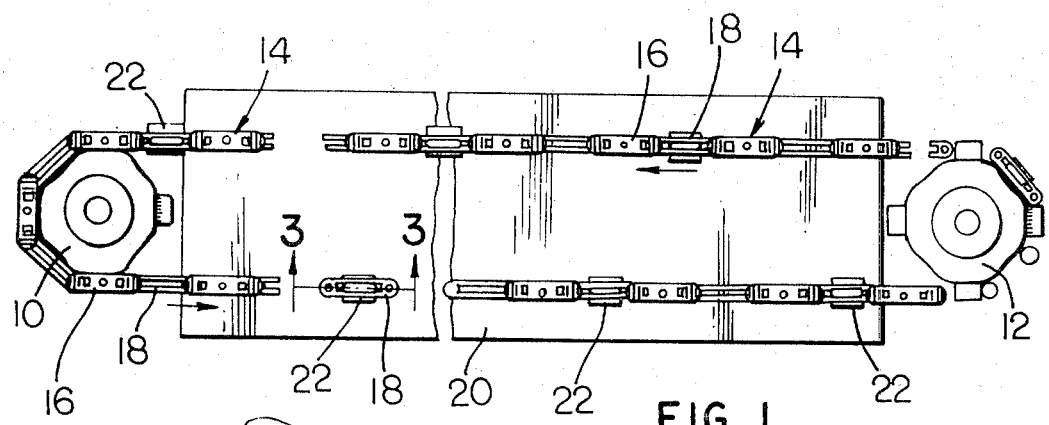
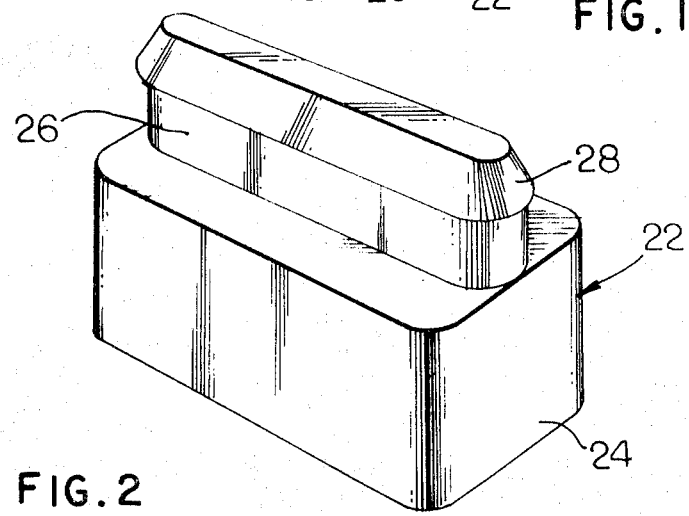
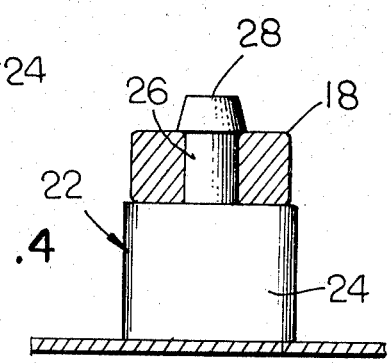
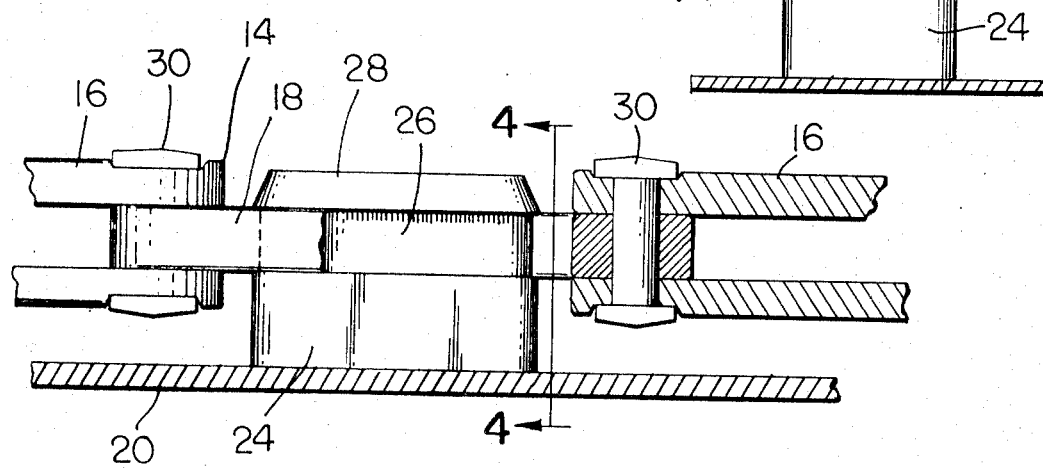
INVENTOR
NIELS S. HANSEN
by Jeffers & Rickert
Attorneys

SUPPORT PAD FOR CONVEYOR CHAIN AND COMBINATION THEREOF WITH CONVEYOR CHAIN

BACKGROUND OF THE INVENTION

The present invention relates to conveyor chains and to pads adapted for being connected to conveyor chains to support the chains in spaced relation to an adjacent surface.

Certain installations, such as car washes, for example, employ conveyor chains running adjacent a stationary surface for advancing vehicles through the installation. In still other cases, chains and the like are employed for transmitting power or for performing work operations and run adjacent a stationary surface. Where the reaches of the chain are of any substantial length, the chain is likely to rest on the surface and to be worn away thereby even to the point of failure of the chain.

In particular, the pivot pins which interconnect the links of the chain are subject to wear and can drop out of the chain or be dislodged therefrom even when the chain, itself, is not badly worn.

With the foregoing in mind, a primary objective of the present invention is the provision of an arrangement for protecting chains from wearing engagement with an adjacent stationary surface.

Another object is the provision of a simple arrangement adapted for being incorporated in a chain structure and operable for supporting the chain so that it does not sag against an adjacent surface and wear from engagement therewith.

Still another object is the provision of a pad device for connection with a chain to support the chain, and which pad device may have a lubricant incorporated directly therein.

The foregoing objects, as well as still other objects and advantages of the present invention, will become more clearly apparent upon reference to the following detailed specification, taken in connection with the accompanying drawings, in which:

DETAILED DESCRIPTION OF THE DRAWINGS

FIG. 1 is a schematic plan view showing a typical conveyor chain arrangement having the support pad of the present invention incorporated therewith;

FIG. 2 is a perspective view showing a typical support pad according to the present invention;

FIG. 3 is a sectional view indicated by line III—III on FIG. 1; and

FIG. 4 is a transverse sectional view indicated by line IV—IV on FIG. 3.

BRIEF SUMMARY OF THE INVENTION

According to the present invention, a pliable pad is provided, having a shank portion or the like adapted for connection with a link of a chain and with the neck or shank portion supporting a block which is disposed between the chain and an adjacent surface and which holds the chain in spaced relation to the surface.

The pad may be of a molded rubber-like material and may have a lubricant directly incorporated therein.

DETAILED DESCRIPTION OF THE INVENTION

Referring to the drawings more in detail, in FIG. 1, 10 and 12 are spaced sprockets about which an endless chain 14 is entrained. Chain 14 comprises links 16 which open horizontally to receive the teeth of the sprockets and intervening links 18 which are open from top to bottom.

The chain has at least one reach extending horizontally over a stationary surface 20 which may, for example, be steel or concrete or the like.

Since the chain may be of substantial length, the reaches thereof between the sprockets 10 and 12 can sag and rub along surface 20. This can lead to deterioration of the chain, in particular the pivot pins thereof, and lead to premature failure of the chain. The present invention proposes to hold the chain in spaced relation to surface 20 by mounting support pads 22 on the chain in spaced relation therealong, preferably on certain ones of the intervening links 18.

A typical pad 22 is illustrated more in detail in FIGS. 2, 3 and 4 and will be seen to comprise a somewhat cubicle block part 24 on the bottom which is disposed between the plane of chain 14 and surface 20 while a shank or neck portion 26 provided on the upper side of block portion 20 is adapted for extending through the respective link 18, which is open from top to bottom for securing the pad to the chain.

Advantageously, the free end of neck or shank portion 26 is enlarged as at 28 and tapers inwardly toward the free end of the neck portion or shank to facilitate assembly of the pad with the link 18.

The block portion 24 of the pad is preferably about the same width as the chain and is shorter than the distance between adjacent pivot pins 30 of the chain and, thus, does not in any way interfere with the travel of the chain about the sprockets 10 and 12.

At the same time, the pads support the chain in spaced relation to the surface against which it might rub and thereby impart longer life to the chain and, likewise, provide for relatively silent operation thereof.

In the usual chain, such as is encountered in car wash installations and the like, the pads may be located, three to twelve feet apart, and it has been found that a conveyor chain supported and guided in this manner not only runs quietly but has a greatly extended length of life over a conventional arrangement wherein the chain can slide along a supporting surface.

The pads are preferably molded of an elastomeric material, such as plastic or synthetic rubber, or rubber, or mixtures thereof, and may have incorporated directly in the compositions a lubricating compound such as graphite.

At least in car wash installations, the surface 20 will usually be wet, and rubber-like pads will slide quite freely thereon, even in the absence of any lubricant contained within the pad.

The pads, for reasons of economy, are preferably molded from a single material, but it would be possible, of course, to form the pads of different materials. For example, the block portion 24 of the pad might have threaded connectors imbedded therein and the pad arrangement be secured to the chain as by bolts or nuts.

In this case, the nuts and bolts would preferably be formed of brass to prevent rusting and to inhibit corrosion thereof. In any case, a block-like pad member is disposed at intervals between the chain and an adjacent surface against which the chain would rub, or which the chain would strike during operation of the chain.

It is furthermore, contemplated that, in case the chain runs in a channel, or the like, where stationary surfaces are disposed on both sides thereof, it might be of advantage to have rubbing blocks projecting from both sides of the chain with respect to the plane of movement thereof.

Modifications may be made within the purview of the appended claims.

What is claimed is:

1. An endless conveyor chain movable in the horizontal direction, an adjacent support surface, said chain having pivotally interconnected links with an aperture extending therethrough in the direction toward the surface, the improvement comprising a support pad member having a substantially large rectilineal lower portion with a neck portion receivable in the aperture of the interconnected link of the conveyor chain to connect the pad member to the link, said rectilineal lower portion having shoulder means engaging the side of the chain which faces the surface and said neck portion having an enlarged region at the free end adapted for engaging the side of the chain which faces away from the surface, whereby said support pad member is detachably connected to the conveyor chain and having its lower rectilineal portion projecting therefrom toward the surface to support the conveyor chain in spaced relation to the surface.

2. A support pad member according to claim 1 wherein the enlarged region on the free end of said neck portion tapers inwardly in the direction toward the free end of said neck portion to facilitate insertion of the neck portion into the aperture of the chain link.

3. A support pad member according to claim 1 wherein a graphite lubricant is directly incorporated therein.

* * * * *